United States Patent
Pennam et al.

(10) Patent No.: US 11,921,531 B2
(45) Date of Patent: Mar. 5, 2024

(54) ZENER DIODE POWER PATH CONTROL FOR EXTENDED OPERATION RANGE OF LINEAR POWER SUPPLIES

(71) Applicant: Hamilton Sundstrand Corporation, Charlotte, NC (US)

(72) Inventors: Hemanth Kumar Pennam, Pradesh (IN); Alagan Thiruvarul Selvakkumaran Sathyan, Tamilnadu (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 130 days.

(21) Appl. No.: 17/173,527

(22) Filed: Feb. 11, 2021

(65) Prior Publication Data

US 2022/0200439 A1    Jun. 23, 2022

(30) Foreign Application Priority Data

Dec. 17, 2020    (IN) .............................. 202011054993

(51) Int. Cl.
| | |
|---|---|
| *G05F 1/571* | (2006.01) |
| *G05F 1/569* | (2006.01) |
| *H02H 9/04* | (2006.01) |

(52) U.S. Cl.
CPC .............. *G05F 1/571* (2013.01); *G05F 1/569* (2013.01); *H02H 9/04* (2013.01)

(58) Field of Classification Search
CPC .......... H02M 1/32; H02M 1/08; H02M 3/155; H02H 9/04; G05F 1/571
See application file for complete search history.

(56) References Cited

U.S. PATENT DOCUMENTS

| | | | | |
|---|---|---|---|---|
| 3,571,608 A | * | 3/1971 | Hurd, III | ................. H02H 9/02 |
| | | | | 361/77 |
| 6,433,526 B2 | | 8/2002 | Micheli | |

(Continued)

FOREIGN PATENT DOCUMENTS

| | | |
|---|---|---|
| CN | 109245513 A | 1/2019 |
| CN | 110048391 A | 7/2019 |

(Continued)

OTHER PUBLICATIONS

Abstract of FR2795567 (B1), Published: Aug. 10, 2001, 1 page.

(Continued)

*Primary Examiner* — Kyle J Moody
*Assistant Examiner* — Jye-June Lee
(74) *Attorney, Agent, or Firm* — CANTOR COLBURN LLP (57) ABSTRACT

A power supply system includes a direct current (DC) power source and a protection circuit having input and an input and an output, the input is operably coupled to the DC power so that, in operation, it receives DC power from the DC power source. The protection circuit includes a first path and a second path that both electrically couple the input to the output, and current passes, in operation, primarily through the first path when a voltage at the input is greater than a threshold voltage related to a Zener diode in the second path and primarily through the second path when the voltage at the input is below the threshold voltage. The system also includes a voltage regulator having an input coupled to the output of the protection circuit.

19 Claims, 4 Drawing Sheets

(56) References Cited

U.S. PATENT DOCUMENTS

| | | | |
|---|---|---|---|
| 7,274,543 B2* | 9/2007 | Nishikawa | H02H 3/20 361/56 |
| 8,330,375 B2* | 12/2012 | Matsui | H05B 45/38 315/80 |
| 9,632,374 B2 | 4/2017 | Murakami | |
| 10,545,521 B2 | 1/2020 | Ramos et al. | |
| 2009/0097181 A1* | 4/2009 | Tamegai | H02J 7/00308 361/91.5 |
| 2013/0335873 A1* | 12/2013 | Lee | H02H 9/041 361/91.2 |
| 2014/0146426 A1* | 5/2014 | Murakami | H02H 9/043 361/56 |
| 2019/0199205 A1 | 6/2019 | Tao et al. | |

FOREIGN PATENT DOCUMENTS

| | | | |
|---|---|---|---|
| CN | 110581641 A | | 12/2019 |
| CN | 110928350 A | | 3/2020 |
| CN | 111064346 A | | 4/2020 |
| FR | 2795567 B1 | | 8/2001 |
| JP | 2018142118 A | * | 9/2018 |
| KR | 10-2018-0120394 | * | 11/2018 |

OTHER PUBLICATIONS

European Search Report for Application No. 21215718.4, dated Jun. 1, 2022, 32 pages.
Translation of CN110048391, published: Jul. 23, 2019.
Van Ham, et al. "A power and data front-end IC for biomedical monitoring systems", Sensors and Actuators A: Physical, Elsevier BV, NL, vol. 147, No. 2, Oct. 3, 2008, pp. 641-648.

* cited by examiner

ZENER DIODE POWER PATH CONTROL FOR EXTENDED OPERATION RANGE OF LINEAR POWER SUPPLIES

CROSS-REFERENCE TO RELATED APPLICATIONS

This application claims the benefit of Indian Patent Application No. 202011054993 filed Dec. 17, 2020, which is incorporated herein by reference in its entirety.

BACKGROUND

Exemplary embodiments pertain to the art of providing power and, in particular, to extending providing power to a linear power supply over an extended range by providing two input voltage dependent paths that are selected by a Zener diode.

In some instances, power is provided to, for example, devices on an aircraft where a constant or near constant supply voltage is desired. In such cases, a linear power supply can be utilized. Such power supplies can include voltage regulators such as linear regulators or other circuit modules.

Linear regulators are simple voltage regulator circuits commonly used in electronics. The regulators are "step-down" converters and operate over a bounded input voltage range. The same can be said of other types of circuit module as well.

The range includes a maximum voltage and sets the upper limit of a voltage that can be safely provided input terminal of, for example, the linear regulator. Typically, to protect the regulators (or other modules) from an over-voltage situation, the voltage is passed through a protection circuit that can be as simply as a single resistor or can be combination of resistors connected in series/parallel or combinations thereof.

BRIEF DESCRIPTION

In one embodiment, a power supply system is disclosed. The system includes a direct current (DC) power source and a protection circuit having input and an input and an output, the input is operably coupled to the DC power so that, in operation, it receives DC power from the DC power source. The protection circuit includes a first path and a second path that both electrically couple the input to the output and current passes, in operation, primarily through the first path when a voltage at the input is greater than a threshold voltage related to a Zener diode in the second path and primarily through the second path when the voltage at the input is below the threshold voltage. The system also includes a voltage regulator having an input coupled to an output of the protection circuit.

Additionally or alternatively, in this or other embodiments, the second path include a first transistor coupled between the input and the output of the protection circuit.

Additionally or alternatively, in this or other embodiments, the second path include a second transistor that controls the operational state of the first transistor based on the voltage at the input and the threshold voltage.

Additionally or alternatively, in this or other embodiments, the second transistor electrically connects an emitter of the first transistor to the base of the first transistor through the second transistor emitter and second transistor collector when the voltage at the input is greater than the threshold such that the first transistor does not pass current from the emitter of the first transistor to a collector of the first transistor.

Additionally or alternatively, in this or other embodiments, the second transistor electrically disconnects and connects an emitter of the first transistor to the base of the first transistor when the voltage at the input is less than the threshold such that the first transistor passes current from the emitter of the first transistor to a collector of the first transistor.

Additionally or alternatively, in this or other embodiments, the Zener diode includes an anode coupled to ground and second path includes a first resistor connected between the input and a cathode of the Zener diode.

Additionally or alternatively, in this or other embodiments, the second transistor includes a collector, a base, and an emitter, wherein the emitter of the second transistor is coupled to the input, the base is coupled to the cathode of the Zener diode through a second resistor and the collector is coupled to a base of the first transistor.

Additionally or alternatively, in this or other embodiments, the base of the first transistor and the collector of the second transistor are coupled to ground through a third resistor.

In another embodiment, a method of extending an operational range of a power supply includes providing a direct current (DC) power source and providing a protection circuit having an input and an output, the input is operably coupled to the DC power source so that, in operation, it receives DC power from the DC power source, wherein the protection circuit includes a first path and a second path that both electrically couple the input to the output. The method also includes passing current primarily through the first path when a voltage at the input is greater than a threshold voltage related to a Zener diode in the second path and passing current primarily through the second path when the voltage at the input is below the threshold voltage.

Additionally or alternatively, in this or other embodiments, providing a voltage regulator having an input coupled to an output of the protection circuit.

Additionally or alternatively, in this or other embodiments, the second path include a first transistor coupled between the input and the output of the protection circuit.

Additionally or alternatively, in this or other embodiments, the second path include a second transistor that controls the operational state of the first transistor based on the voltage at the input and the threshold voltage.

Additionally or alternatively, in this or other embodiments, the second transistor electrically connects an emitter of the first transistor to the base of the first transistor when the voltage at the input is greater than the threshold such that the first transistor does not pass current from the emitter of the first transistor to a collector of the first transistor.

Additionally or alternatively, in this or other embodiments, the second transistor electrically disconnects connects an emitter of the first transistor to the base of the first transistor when the voltage at the input is less than the threshold such that the first transistor passes current from the emitter of the first transistor to a collector of the first transistor.

Additionally or alternatively, in this or other embodiments, the Zener diode includes an anode coupled to ground and second path includes a first resistor connected between the input and a cathode of the Zener diode.

Additionally or alternatively, in this or other embodiments, the second transistor includes a collector, a base, and an emitter, wherein the emitter of the second transistor is coupled to the input, the base is coupled to the cathode of the Zener diode through a second resistor and the collector is coupled to a base of the first transistor.

Additionally or alternatively, in this or other embodiments, the base of the first transistor and the collector of the second transistor are coupled to ground through a third resistor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments of the systems and methods detailed herein pertain to system that can expand the operating range of a particular power supply. As discussed above, some power supplies can include a protection circuit to protect circuit modules (e.g., a linear or other regulators) from damage. Such a protection circuit can achieve this by, for example, providing one or more power sharing resistors to limit the maximum voltage and will define a first path herein.

In the following discussion, from time to time circuit modules will be referred to and that term includes, but is not limited to, regulators and, in particular, linear regulators. Also, while specific embodiments may illustrate the module as a linear regulator, those embodiments may be applied to any module that includes, for example, a bounded input voltage range.

However, in the case a lower end of the supply output the protection circuit can limit voltage provided to the modules such that a small dip in the supply voltage may result in a voltage below the operating range of a particular modules which result in circuits reset and/or malfunctioning etc.

Embodiments herein can provide a lower resistance path from the supply to the module when the voltage drop below threshold level. This can be accomplished, for example, by providing a bypass, second, alternative, or low resistance current path from the power supply to a load or controlled device.

The low resistance, bypass or second path is controlled by a Zener diode. In particular, when the voltage at the input to the second path is below the Zener voltage of the Zener diode (or a threshold that is related to the Zener voltage e.g., a voltage set based on the Zener diode and another element such as a resistor), the second path will become conductive and pass the same or a very similar voltage to the module. While not required, the second path can provide a complete or substantially complete short around the first path. That is, when the second path is active, almost no current traverses the first path containing the protection circuit thus, no voltage is dropped across that circuit.

Figure 1:
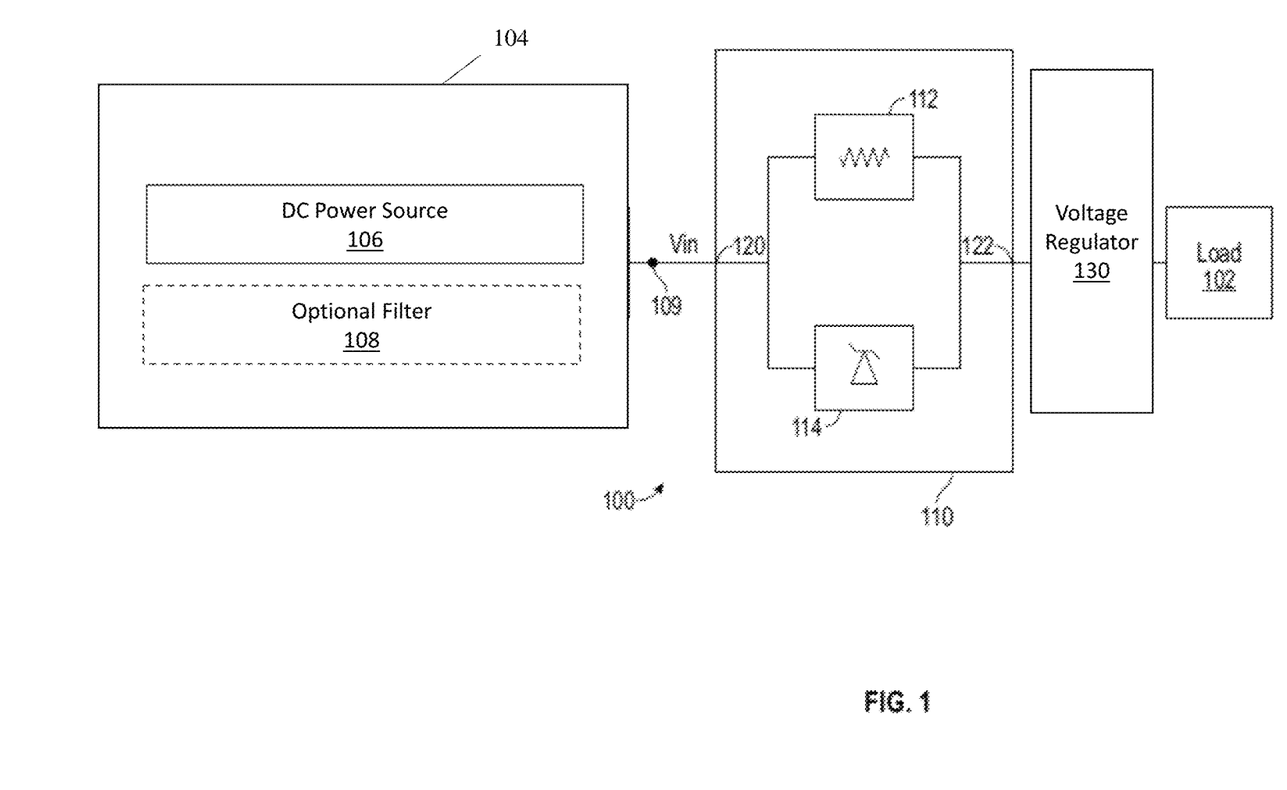
FIG. 1 shows an example of power supply system shown in a block diagram form.

FIG. 1 is high level block diagram showing an embodiment of a system 100 that includes a Zener controlled bypass path. The system 100 or parts thereof can be implemented in a line replaceable unit (LRU).

A line-replaceable unit (LRU), is a modular component of an air or spacecraft (or any other manufactured device) that is designed to be replaced quickly at an operating location.

The system 100 used, for example, to provide a constant voltage to a load 102. The load 102 can be, for example, electronics components such as Operational amplifiers, integrated circuits, drivers, discrete elements, etc. The components can be included in the LRU or outside of it.

The system 100 includes a power source 104. In one embodiment, the power source 104 can include a DC power source 106 and, optionally, an output filter 108. The DC power source can be implemented as a diode or other rectifier in one embodiment that converts AC power received, for example, from a generator (not shown) to DC power. The filter 108 can be implemented with one or more smoothing or hold-up capacitors. The output of the power source 104 is, generally, a stable DC voltage Vin and is provided at power source output 109.

The system also includes protection circuit 110. The protection circuit 110 defines first and second paths 112, 114. Both the first and second paths 112, 114 couple an input 120 of the protection circuit 110 to an output 122 of the protection circuit 110. The input 120 is coupled to the power source output 109. As more fully explained below, depending on Vin current passes primarily through one of the first or second paths. The term primarily can mean that 90 percent or more of the current passes through one of the paths with the remaining (if any) passing through the other. In one embodiment, the second path 114 passes the current such there is little to no voltage drop between the input and the output 120, 122.

The selection of path is based, in one embodiment, on a relationship between Vin and the Zener voltage (Vz) of a Zener diode in the second path 114. Generally, the second path is selected when Vin is less than Vz (e.g., the Zener diode is conductive) as more fully shown below. In other cases, the second path 114 is blocked and current flows through the first path 112. The first path 112 is generally resistive and ensures that an over-voltage is not provided to a down-stream component. Of course, one or more circuit elements can be added in the second path that vary the relationship between Vin and Vz. Thus, herein, the term "threshold voltage" will be utilized to describe situations where the Zener diode becomes conductive in the second path. This voltage, will typically be the same as or higher than the Vz.

Regardless of path, the output 122 of the protection circuit 110 is coupled to a power supply device such as a voltage regulator 130. The voltage regulator 130 is a linear regulator in one embodiment. The voltage regulator 130 supplies a constant voltage to the load 102 in one embodiment. It shall be understood, the Zener diode in the second path can be selected based on the operating range of the voltage regulator 130 and the voltage range of Vin (e.g, the voltage range of the power supply).

Figure 2:
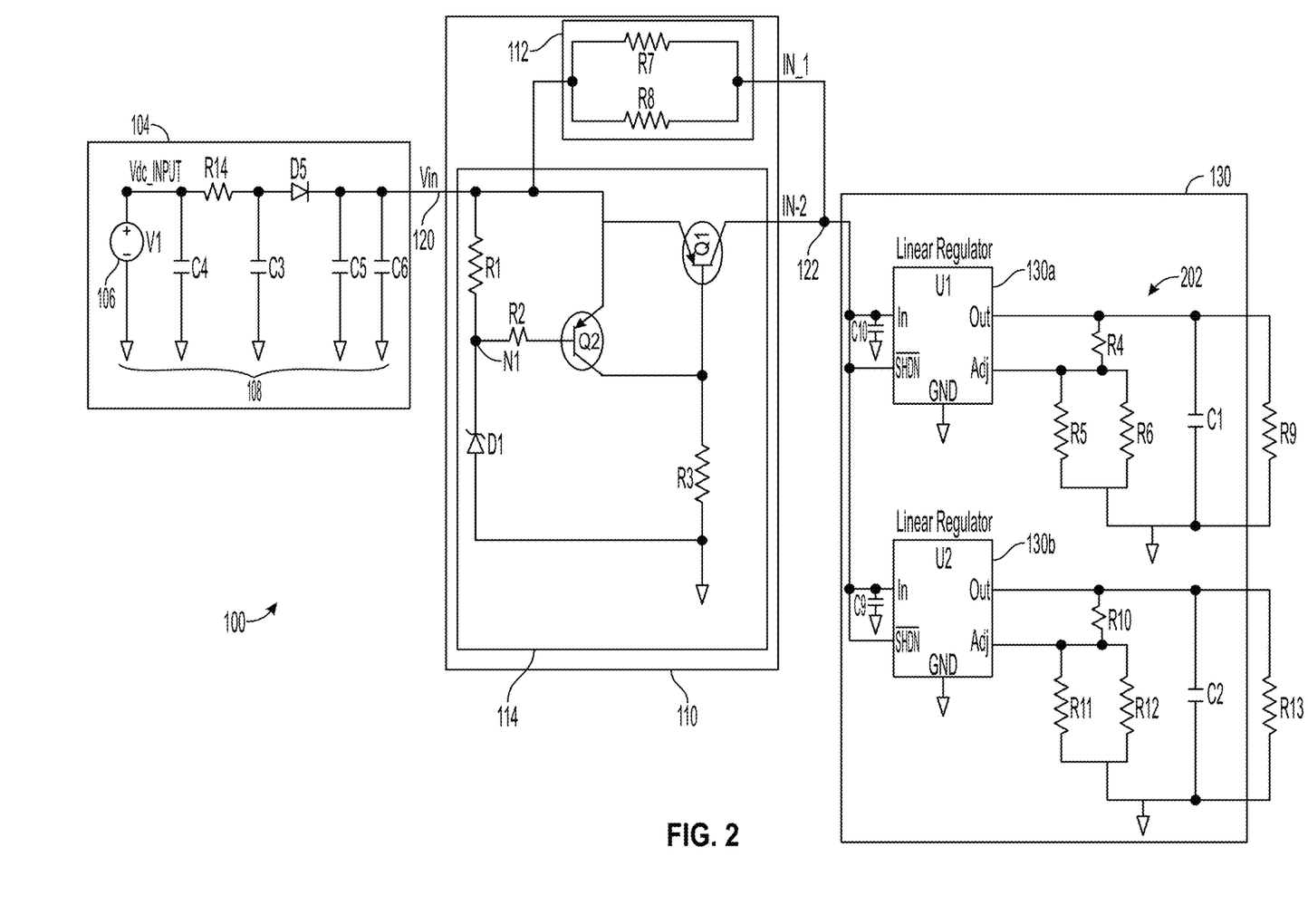
FIG. 2 is a circuit diagram one possible implementation of the power supply system shown in FIG. 1.

FIG. 2 is a more specific example of a system 100 that provides a voltage to a load (shown as resistive loads R9/R13). As illustrated, the system 100 will provide a constant voltage to one or more loads as it includes two voltage regulator units 130a, 130b. As shown, the voltage regulators 130 include output shaping electronics 202 that can be varied based on application and can be inside or outside of integrated circuit/chip of the regulators 130. As illustrated, the output shaping electronics 202 connected to the first voltage regulator 130a is comprised of resistors R4/R5/R6 that are used to configure the output voltage of the linear regulator and that are arranged in parallel with capacitor C1 and the output and adjust pins of the first voltage regulator 130a. The voltage is provided to the load (shown as R9). As illustrated, the output shaping electronics 202 connected to the second voltage regulator 130b is comprised of resistors R10/R11/R12 that are used to configure the output voltage of the linear regulator 130b and that are arranged in parallel with capacitor C2 and the output and adjust pins of the second voltage regulator 130b. 130a. The voltage is provided to the load (shown as R13). Both voltage regulators 130a, 130b include capacitors (C10, C9) coupled to their pins. The elements connected to particular pins are shown for illustrative purposes only and are not limiting or required to practice embodiments disclosed herein.

The power supply 104 includes a DC voltage source 106. The DC voltage source provides a supply voltage of Vdc input. In one embodiment Vdc input, is between about 10 and 40 volts and, in particular, between 16 and 32 volts. Vdc input is smoothed or otherwise adjusted by optional filter 108. As shown, the filter 108 includes multiple capacitors C3-C6, resistor R14 and a diode D5. The elements forming the optional filter 108 are shown for illustrative purposes only and are not limiting or required to practice embodiments disclosed herein.

Regardless of whether the filter 108 is provided, the power supply will provide a voltage of Vin to the input 120 of the protection circuit 110. Generally, when Vin is greater than the threshold voltage, the Zener diode D1 is conductive. As explained more fully below, when D1 is conductive, blocking transistor Q1 is not conductive and current does not pass through it from the input 120 to the output 122. In such a case, the current passes through the resistive first path 112. As shown, the resistive first path 112 is implemented as a current sharing circuit with two parallel connected resistors R7/R8 between the input 120 and the output 122. The elements forming the resistive first path 112 are shown for illustrative purposes only and are not limiting or required to practice embodiments disclosed herein. For example, R7 and R8 could be implanted as single resistor or be serially connected. Other configurations are also possible. The resistive first path 112 serves, in one embodiment, to ensure that voltage at the output 122 does not exceed a desired value (e.g., the upper limit of the operating range of the voltage regulators 130a/130b).

The second path 114 is arranged between the input 120 and output 122. The blocking transistor Q1 is connected between the input 120 and the output 122 and controls whether current can pass through the second path 114 between them. As stated above, Q1 is not conductive when D1 is conductive and is conductive when D1 is not conductive.

In the following description, the transistors Q1/Q2 will be assumed to be bipolar junction transistors (BJTs) and appropriate nomenclature will be applied. However, other types of transistors can be utilized. Further, while PNP BJTs are shown, the skilled artisan will realize that NPN BJTs could be utilized.

In order to conduct, a current has to flow "out" of the base of Q1. As shown below, Q2 controls whether that can happen based on operation of the Zener diode D1.

Figure 3:
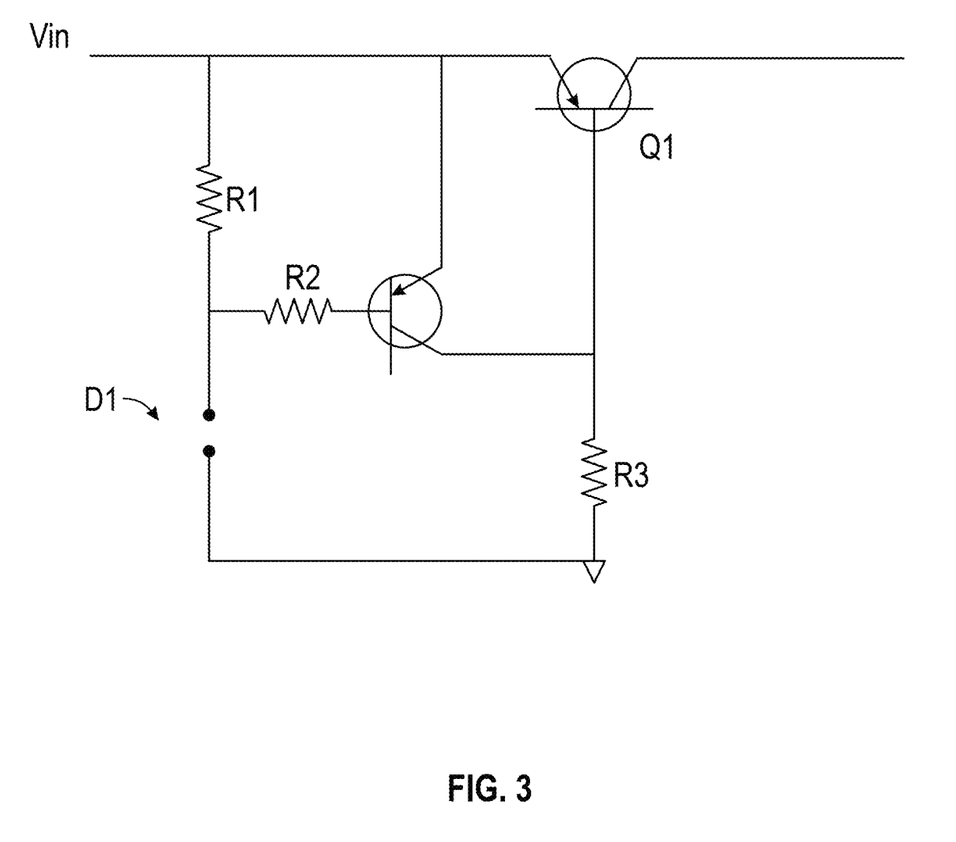
FIG. 3 shows an interpretation of the circuit of FIG. 2 when Vin is less than Vzener (or another threshold)

Consider first the case where Vin is less than Vzener. As shown in FIGS. 2, R1 and D1 are series connected between the input 120 and ground. When Vin in less than the reverse breakdown voltage of the Zener diode D1 (Zener voltage or Vzener) no current passes through R1 to ground as D1 is effectively an open circuit. As such, no current can flow out from the base of Q2 and Q2 is also effectively an open circuit. Stated differently, if no current can pass through R1, the voltage at emitter and base of Q2 are the same. Therefore Vbe is zero and Q2 is not conductive. For illustrative purposes, the Zener controlled second path 114 can be shown as in FIG. 3 in such instances. In FIG. 3, the base of Q1 is effectively grounded through R3 and as long as Vin is greater than the turn on voltage of Q1 (about 0.7V) Q1 will be conductive.

Figure 4:
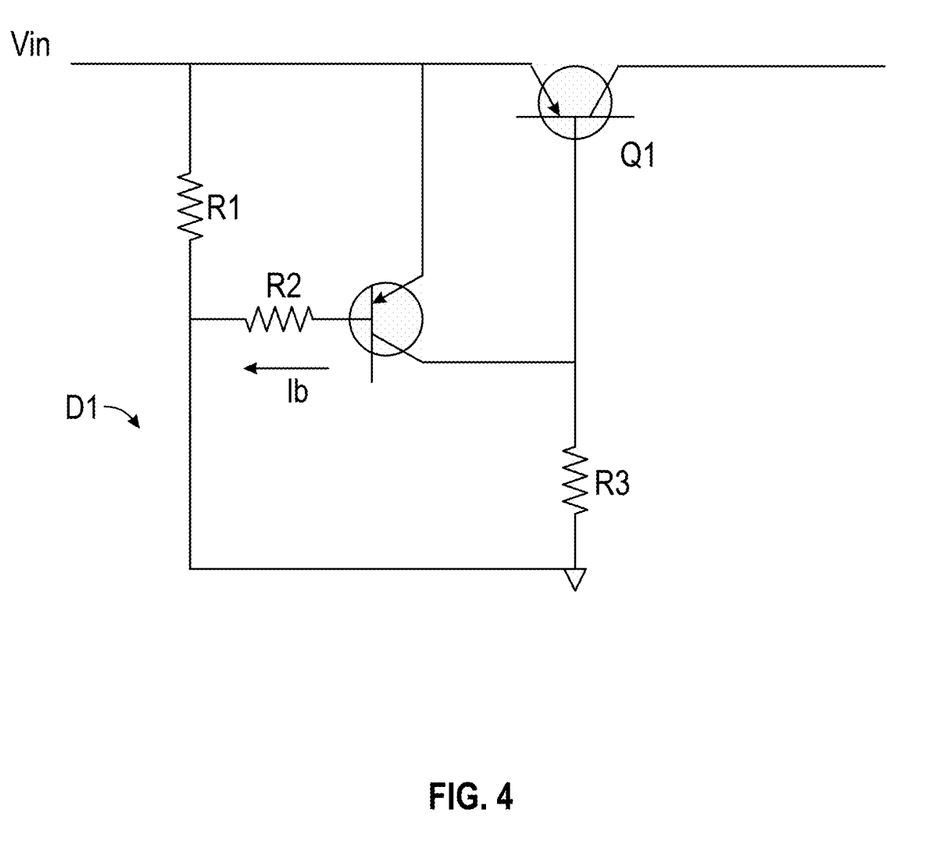
FIG. 4 shows an interpretation of the circuit of FIG. 2 when Vin is greater than Vzener (or another threshold).

Now consider the case where Vin greater than Vzener. In such a case, the Zener diode D1 is effectively a short as indicated in FIG. 4. This will allow current (Ib) to flow out of the base of Q2 and allow Q2 to become conductive. When Q2 is conductive it effectively shorts the Emitter of Q1 to the Base of Q1, thus Q1 is not conductive because Vbe is about Zero or less than 0.7V. Stated differently, Q2 is configured such that it disables operation of Q1 when Vin is greater than a threshold that is, or is based on, Vzener.

As shown in FIG. 2, the Zener controlled second path 110 can include R1 coupled between the input 120 and cathode of the Zener diode D1. The anode of the Zener diode D1 is coupled to ground.

As shown, the anode of D1 is directly coupled to ground but elements could be connected between them. Further, certain other connections as shown as being direct herein, it shall be understood that such a direct connection is not required other connections (e.g., indirect with one or more elements between the connected elements) are also considered. To that end, herein, the term coupled is used to denote either a direct or indirect connection.

The node (N1) between R1 and D1 is coupled through R2 to the base of Q2. The emitter of Q2 is coupled to the input 120. The collector of Q2 is coupled to ground through R3. The emitter of Q1 is coupled to the input 120 and the collector of Q1 is coupled to the output 122. The base of Q1 is coupled to ground through R3 and is also coupled the collector of Q2. Example values of the elements in the protection circuit 110 include: R1=2 k ohms, R2=4.99 k Ohms when D1 has a Zener voltage of 22V. In such a case, R7 and R8 may be, for example, 49.9 ohms. Of course, depending on Vzener, the resistances can changed.

If shall be understood that above while a circuit has been shown, a method has also been disclosed. This method, generally, includes providing a protection circuit that has two paths. Most or all of the current proved to the protective circuit passes through the protection circuit along a primarily (or completely) resistive path when an input to the protection circuit is below a threshold voltage. The threshold voltage is equal to or based on a Zener voltage of Zener diode in the other (second or Zener controlled) path. Current passes a primarily (or completely) through the other path when the input to the protection circuit is above the threshold voltage. Such a selection can be made by "opening" and closing a switch (e.g., a transistor) in the second path.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power supply system comprising:
   a direct current (DC) power source;
   a protection circuit having an input and an output, wherein the input is operably coupled to the DC power source so that, in operation, it receives DC power from the DC power source,
   wherein the protection circuit includes:
   a resistive first path formed of resistors and that has a first resistance; and
   a transistor controlled second path that is in parallel with the resistive first path;
   wherein both the resistive first path and the transistor controlled second path both electrically couple the input to the output, wherein the transistor controlled second path has a lower resistance than the first resistance;
   wherein current passes, in operation, primarily through the resistive first path when a voltage at the input is greater than a threshold voltage related to a Zener diode in the second path and primarily through the second path when the voltage at the input is below the threshold voltage; and
   a voltage regulator having an input coupled to the output of the protection circuit.

2. The power supply system of claim 1, wherein the transistor controlled second path includes a first transistor coupled between the input of the protection circuit and the output of the protection circuit.

3. The power supply system of claim 2, wherein the transistor controlled second path includes a second transistor that controls the operational state of the first transistor based on the voltage at the input of the protection circuit and the threshold voltage.

4. The power supply system of claim 3, wherein the second transistor electrically connects an emitter of the first transistor to a base of the first transistor through a second transistor emitter and a second transistor collector when the voltage at the input of the protection circuit is greater than the threshold voltage such that the first transistor does not pass current from the emitter of the first transistor to a collector of the first transistor.

5. The power supply system of claim 3, wherein the second transistor electrically disconnects and connects an emitter of the first transistor to a base of the first transistor when the voltage at the input of the protection circuit is less than the threshold voltage such that the first transistor passes current from the emitter of the first transistor to a collector of the first transistor.

6. The power supply system of claim 3, wherein the Zener diode includes an anode coupled to ground and the transistor controlled second path includes a first resistor connected between the input of the protection circuit and a cathode of the Zener diode.

7. The power supply of claim 6, wherein the second transistor includes a collector, a base, and an emitter, wherein the emitter of the second transistor is coupled to the input of the protection circuit, the base is coupled to the cathode of the Zener diode through a second resistor and the collector of the second transistor is coupled to a base of the first transistor.

8. The power supply of claim 7, wherein the base of the first transistor and the collector of the second transistor are coupled to ground through a third resistor.

9. The system of claim 1, wherein the resistive first path is formed only of resistors.

10. A method of extending an operational range of a power supply comprising:
    providing a direct current (DC) power source;
    providing a protection circuit having an input and an output, wherein the input is operably coupled to the DC power source so that, in operation, it receives DC power from the DC power source, wherein the protection circuit includes a resistive first path formed of resistive elements and a transistor controlled second path, wherein the resistive first path and the transistor controlled second path both electrically couple the input to the output, wherein the transistor controlled second path has a lower resistance than a resistance of the first path;
    passing current primarily through the resistive first path when a voltage at the input is greater than a threshold voltage related to a Zener diode in the second path; and
    passing current primarily through the transistor controlled second path when the voltage at the input is below the threshold voltage.

11. The method of claim 10, further comprising:
    providing a voltage regulator having an input coupled to the output of the protection circuit.

12. The method of claim 10, wherein the transistor controlled second path includes a first transistor coupled between the input of the protection circuit and the output of the protection circuit.

13. The method of claim 12, wherein the transistor controlled second path includes a second transistor that controls an operational state of the first transistor based on the voltage at the input of the protection circuit and the threshold voltage.

14. The method of claim 13, wherein the second transistor electrically connects an emitter of the first transistor to a base of the first transistor when the voltage at the input of the protection circuit is greater than the threshold such that the first transistor does not pass current from the emitter of the first transistor to a collector of the first transistor.

15. The method of claim 13, wherein the second transistor electrically disconnects connects an emitter of the first transistor to a base of the first transistor when the voltage at the input of the protection circuit is less than the threshold voltage such that the first transistor passes current from the emitter of the first transistor to a collector of the first transistor.

16. The method of claim 13, wherein the Zener diode includes an anode coupled to ground and the transistor controlled second path includes a first resistor connected between the input of the protection circuit and a cathode of the Zener diode.

17. The method of claim 16, wherein the second transistor includes a collector, a base, and an emitter, wherein the emitter of the second transistor is coupled to the input of the protection circuit, the base of the second transistor is coupled to the cathode of the Zener diode through a second resistor and the collector is coupled to a base of the first transistor.

18. The method of claim 17, wherein the base of the first transistor and the collector of the second transistor are coupled to ground through a third resistor.

19. The method of claim 10, wherein the resistive first path is formed only of resistors.

* * * * *